(12) United States Patent
Ohmura et al.

(10) Patent No.: US 10,322,720 B2
(45) Date of Patent: Jun. 18, 2019

(54) VEHICLE CONTROL DEVICE INCLUDING OBJECT DETECTION, SPEED DISTRIBUTION AREA SETTING AND AVOIDANCE CONTROL EXECUTION SECTIONS

(71) Applicant: MAZDA MOTOR CORPORATION, Hiroshima (JP)

(72) Inventors: Hiroshi Ohmura, Hiroshima (JP); Tetsuya Tachihata, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/674,047

(22) Filed: Aug. 10, 2017

(65) Prior Publication Data

US 2018/0056997 A1 Mar. 1, 2018

(30) Foreign Application Priority Data

Sep. 1, 2016 (JP) .................................. 2016-170673

(51) Int. Cl.
*A01B 69/00* (2006.01)
*B60W 30/09* (2012.01)
(Continued)

(52) U.S. Cl.
CPC ............ *B60W 30/09* (2013.01); *B60W 10/20* (2013.01); *B60W 40/04* (2013.01);
(Continued)

(58) Field of Classification Search
CPC ....... B60W 30/09; B60W 10/20; B60W 40/04
See application file for complete search history.

(56) References Cited

U.S. PATENT DOCUMENTS

2002/0072843 A1\* 6/2002 Russell .............. B60K 31/0008
701/96
2013/0293395 A1 11/2013 Ohama et al.
(Continued)

FOREIGN PATENT DOCUMENTS

JP 2009-086788 A 4/2009
JP 2010-083314 A 4/2010
(Continued)

OTHER PUBLICATIONS

JP Office Action dated Feb. 26, 2018, from corresponding JP Appl No. 2016-170673, 4 pp.

*Primary Examiner* — Adam M Alharbi
(74) *Attorney, Agent, or Firm* — Studebaker & Brackett PC

(57) ABSTRACT

A vehicle control device mounted in a vehicle comprises an object detection section for detecting a connection path which is connected to a traveling road, a speed distribution area setting section for setting a speed distribution area, and an avoidance control execution section for executing avoidance control of changing the vehicle speed and/or a steering direction of the vehicle to prevent the vehicle speed from exceeding the allowable upper limit value in the speed distribution area, wherein the speed distribution area setting section is configured, upon detection of the connection path by the object detection section, to set the speed distribution area on an assumption that an object exists in a connection region between the detected connection path and the traveling road.

7 Claims, 7 Drawing Sheets

(51) Int. Cl.
    *B60W 10/20*     (2006.01)
    *B60W 40/04*     (2006.01)
    *G08G 1/16*     (2006.01)

(52) U.S. Cl.
    CPC ..... *B60W 2420/42* (2013.01); *B60W 2550/30* (2013.01); *B60W 2710/20* (2013.01); *B60W 2720/10* (2013.01); *G08G 1/166* (2013.01); *G08G 1/167* (2013.01)

(56) References Cited

U.S. PATENT DOCUMENTS

| | | |
|---|---|---|
| 2014/0188365 A1 | 7/2014 | Nagata |
| 2015/0367845 A1* | 12/2015 | Sannodo ............... B60W 30/06 701/23 |
| 2018/0065627 A1* | 3/2018 | Ohmura ................ B60W 30/09 |

FOREIGN PATENT DOCUMENTS

| | | |
|---|---|---|
| JP | 2012-118741 A | 6/2012 |
| WO | 2013-021489 A1 | 2/2013 |

* cited by examiner

VEHICLE CONTROL DEVICE INCLUDING OBJECT DETECTION, SPEED DISTRIBUTION AREA SETTING AND AVOIDANCE CONTROL EXECUTION SECTIONS

TECHNICAL FIELD

The present invention is related to a vehicle control device, and more particularly to a vehicle control device for assisting safe traveling of a vehicle.

BACKGROUND ART

Suppose a situation where, when an own vehicle is traveling in a traveling lane, a second vehicle turns left from a right side road at a forward T-shaped intersection. In this situation, if the second vehicle turns with an excessively large turning radius causing the second vehicle to enter the traveling lane of the own vehicle, the own vehicle and the second vehicle are likely to have a minor collision. With a view to avoiding such a danger, there has been proposed a technique of, when, on a side road located forward of an own vehicle, a second vehicle is detected, predicting a turning trajectory of the second vehicle to enable the own vehicle to automatically perform an avoidance action (see, for example, Patent Document 1).

CITATION LIST

[Patent Document]
Patent Document 1: JP 2010-083314 A

SUMMARY OF INVENTION

Technical Problem

However, in a vehicle driving assistance system described in Patent Document 1, for example, when the side road is provided between walls, the second vehicle is hidden behind the wall, so that it becomes impossible to visually recognize the second vehicle from the own vehicle. Thus, the second vehicle on the forward side road is not detected, resulting in failing to perform the automatic avoidance action. Moreover, when a bicycle, a pedestrian or the like enters the traveling road from a blind area behind the wall, an avoidance action by the driver is likely to delay.

The present invention has been made to solve such problems. It is therefore an object of the present invention to provide a vehicle control device capable of, in a situation where it is impossible to detect a mobile object in a blind area located forward of a vehicle, causing the vehicle to perform an avoidance action so as to cope with emergence of a mobile object.

Solution to Technical Problem

In order to achieve the above object, the present invention provides a vehicle control device mounted in a vehicle, comprising: an object detection section for detecting a connection path which is connected, at a position forward of the vehicle, to a traveling road on which the vehicle is traveling; a speed distribution area setting section for setting a speed distribution area extending at least in a lateral spatial region with respect to an object located forward of the vehicle and defining a distribution of an allowable upper limit value of a vehicle speed of the vehicle, wherein the speed distribution area is set such that the allowable upper limit value becomes lower as a distance from the object becomes smaller; and an avoidance control execution section for executing avoidance control of changing the vehicle speed and/or a steering direction of the vehicle to prevent the vehicle speed of the vehicle from exceeding the allowable upper limit value in the speed distribution area; wherein the speed distribution area setting section is configured, upon detection of the connection path by the object detection section, to set the speed distribution area on an assumption that an object exists in a connection region between the detected connection path and the traveling road.

In the vehicle control device of the present invention configured as above, when the connection path connected to the traveling road at a position forward of the vehicle is detected during traveling of the vehicle, a virtual object is assumed to exist in the connection region between the detected connection path and the traveling road, and, based on this assumption, the speed distribution area is set with respect to the virtual object. Thus, in the present invention, in a specific area of the traveling road to which the connection path is connected, the vehicle speed of the vehicle is limited by the allowable upper limit value in the set speed distribution area, and/or the steering direction is controlled to prevent the vehicle speed from exceeding the allowable upper limit value. Therefore, even in a situation where a second vehicle, a pedestrian or the like unexpectedly enters the specific area of the traveling road to which the connection path is connected, the vehicle control device of the present invention makes it possible to reliably avoid a minor collision with the entered object.

Preferably, in the vehicle control device of the present invention, the speed distribution area setting section is configured, when it determines that at least a part of the connection region between the detected connection path and the traveling road is a blind area of the vehicle, to set the speed distribution area.

According to this feature, even in a situation where it fails to detect an object, such as a second vehicle, a pedestrian or a bicycle, which exists in the blind area of the connection region between the detected connection path and the traveling road, the speed distribution area is set on the assumption that it exists. Thus, even when a potential object failing to be detected enters the traveling road, the vehicle control device of the present invention makes it possible to avoid a minor collision with the entered object.

Specifically, the blind area is formed by a side wall delimiting the traveling road or the connection path.

Preferably, in the vehicle control device of the present invention, the object detection section is configured to detect the connection path, based on map information and current vehicle position information, or based on image data taken by a vehicle-mounted camera.

Preferably, in the vehicle control device of the present invention, the connection path is a side road connected to the traveling road, or a space defined between two structural objects arranged along the traveling road.

According to this feature, the connection path includes not only a side road connected to the traveling road, but also a space between two structural objects arranged along the traveling road. That is, the connection path additionally includes a space which is not generally recognized as a road. This makes it possible to execute the avoidance control so as to cope with the situation where a pedestrian or the like enters from such a connection path into the traveling road.

Specifically, the two structural objects include two vehicles.

Preferably, vehicle control device of the present invention is configured such that, when the connection path is detected at a position on or adjacent to a pedestrian crossing extending across the traveling road, the speed distribution area is set such that, as compared to when the connection path is detected at a position which is not located on or adjacent to the pedestrian crossing, the allowable upper limit value of the speed distribution area becomes lower at the same lateral distance.

Generally, when the connection path is located around a pedestrian crossing, a possibility that a pedestrian enters the traveling road is higher, as compared to when the connection path is not located around a pedestrian crossing. According to the above feature, it becomes possible to set the speed distribution area such that the vehicle speed of the vehicle is limited to a lower value in the connection path around the pedestrian crossing, thereby providing improved safety.

Effect of Invention

The present invention can provide a vehicle control device capable of efficiently executing vehicle control for assisting safe driving of a vehicle.

DESCRIPTION OF EMBODIMENTS

Figure 1:
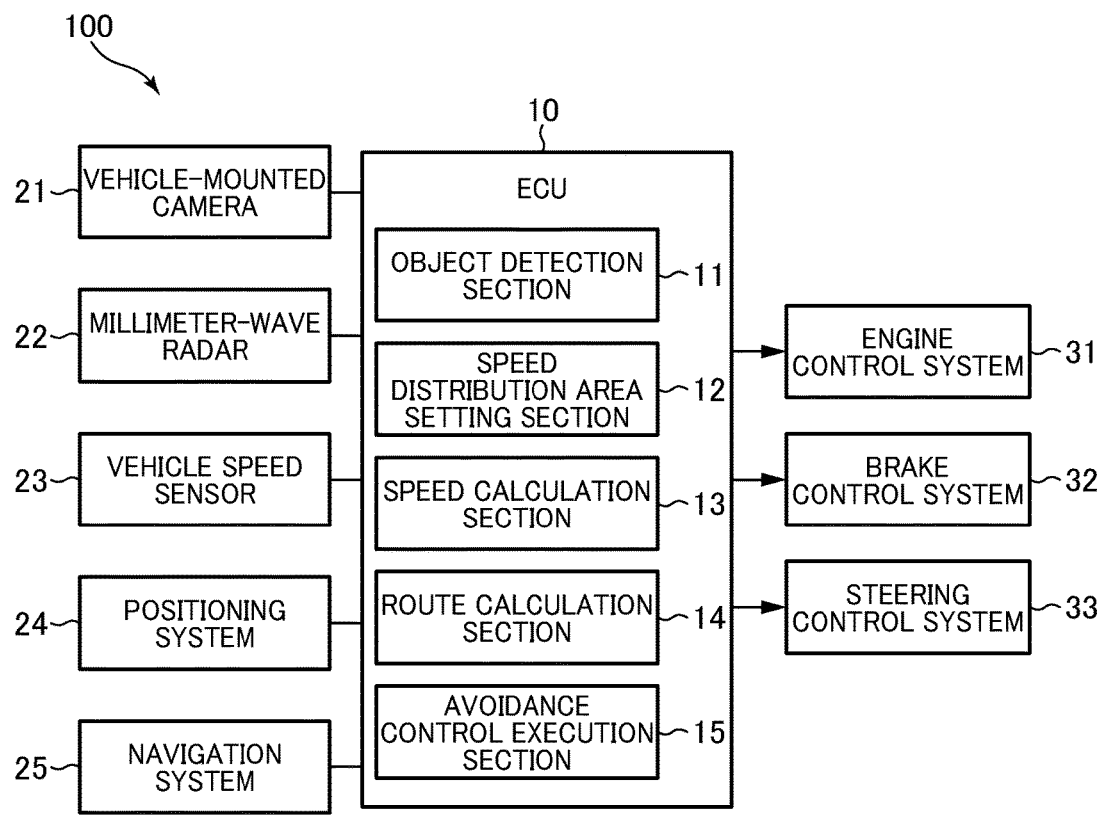
FIG. 1 is a block diagram depicting a configuration of a vehicle control system according to one embodiment of the present invention.

With reference to the accompanying drawings, a vehicle control system according to one embodiment of the present invention will now be described. First of all, with reference to FIG. 1, a configuration of the vehicle control system will be described. FIG. 1 is a block diagram depicting the configuration of the vehicle control system.

As depicted in FIG. 1, the vehicle control system 100 mounted in a vehicle 1 (see FIG. 2) comprises a vehicle control device (ECU) 10, a plurality of sensors, and a plurality of vehicle control subsystems. The plurality of sensors include a vehicle-mounted camera 21, a millimeter-wave radar 22, a vehicle speed sensor 23, a positioning system 24, and a navigation system 25. The plurality of vehicle control subsystems include an engine control system 31, a brake control system 32, and a steering control system 33.

The ECU 10 is composed of a computer which comprises a CPU, a memory for storing various programs, and an input/output device, etc. The ECU 10 is configured to be capable of, based on signals received from the plurality of sensors, outputting request signals, respectively, to the engine control system 31, the brake control system 32 and the steering control system 33 so as to appropriately operate corresponding ones of an engine system, a brake system and a steering system. The ECU 10 functionally comprises an object detection section 11, a speed distribution area setting section 12, a speed calculation section 13, a course calculation section 14, and an avoidance control execution section 15.

The vehicle-mounted camera 21 is configured to take images around the vehicle 1 and output taken image data. The ECU 10 is configured, based on the image data, to determine an object (e.g., a vehicle, a pedestrian, a road or an intersection).

The millimeter-wave radar 22 is a measuring device for measuring a position and a speed of the object, and is configured to transmit a radio wave (transmitted wave) toward a forward spatial region with respect to the vehicle 1, and receive a reflection wave arising from reflection of the transmission wave by the object. The millimeter-wave radar 22 is configured, based on the transmitted wave and the received wave, to measure a distance between the vehicle 1 and the object (e.g., inter-vehicle distance), and a relative speed of the object with respect to the vehicle 1. Alternatively, the vehicle control system according to this embodiment may be configured to measure the distance or the relative speed with respect to the object, using a laser radar, an ultrasonic sensor or the like, instead of the millimeter-wave radar 22. Further, a position and speed measuring device may be constructed using a plurality of sensors.

The vehicle speed sensor 23 is configured to calculate an absolute speed of the vehicle 1. The positioning system 24 is a GPS system and/or a gyroscope system, and is configured to calculate a position (current vehicle position information) of the vehicle 1. The navigation system 25 internally stores map information, and is capable of providing the map information to the ECU 10. The ECU 10 is configured, based on the map information and the current vehicle position information of the vehicle 1, to identify roads, intersections, traffic signals, buildings, and the like which exist around the vehicle 1 (particularly, forwardly in a traveling direction of the vehicle 1). The map information may be stored in the ECU 10.

The engine control system 31 comprises a controller for controlling an engine of the vehicle 1. The ECU 10 is configured, when it is necessary to accelerate or decelerate the vehicle 1, to output to the engine control system 31, an engine output change request signal for requesting change of a power output of the engine.

The brake control system 32 comprises a controller for controlling a brake device of the vehicle 1. The ECU 10 is configured, when it is necessary to decelerate the vehicle 1, to output to the brake control system 32, a braking request signal for requesting generation of a braking force against the vehicle 1.

The steering control system 33 comprises a controller for controlling a steering device of the vehicle 1. The ECU 10 is configured, when it is necessary to change the traveling direction of the vehicle 1, to output to the steering control system 33, a steering direction change request signal for requesting change of a steering direction of the vehicle 1.

Figure 2:
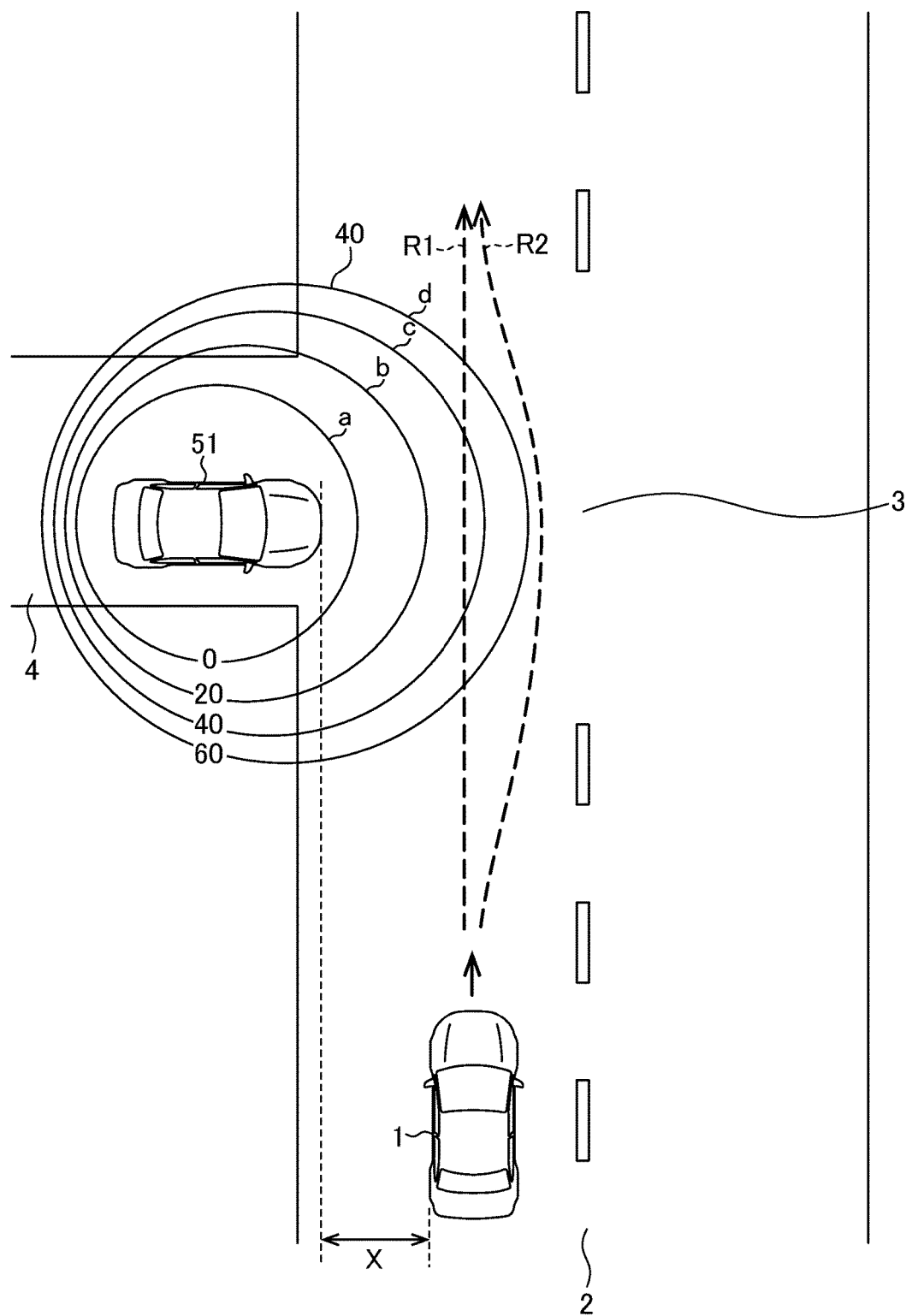
FIG. 2 is an explanatory diagram of a passing speed control in this embodiment.
Figure 3:
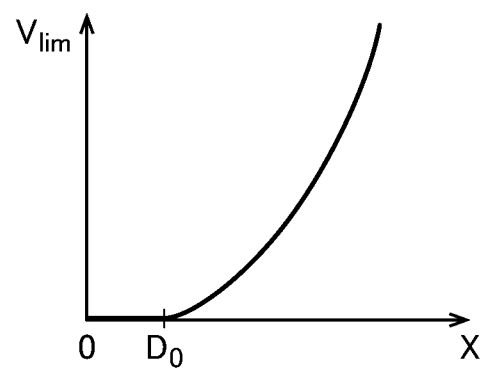
FIG. 3 is an explanatory diagram presenting a relationship between an allowable upper limit value of a passing speed and a clearance, in a lateral position with respect of an object, in this embodiment.

Next, with reference to FIGS. 2 and 3, an outline of a passing speed control in this embodiment will be described. FIG. 2 is an explanatory diagram of the passing speed control, and FIG. 3 is an explanatory diagram presenting a relationship between an allowable upper limit value of a passing speed and a clearance, in a lateral position with respect to an object.

FIG. 2 depicts a state in which the vehicle travels on a traveling road 2 and is approaching a forward T-shaped intersection 3. The T-shaped intersection 3 is formed such that a side road 4 is connected to the traveling road 2. In FIG. 2, a second vehicle 51 temporality stops on the side road 4 at the T-shaped intersection 3.

Generally, when a traveling vehicle passes by (or overtakes) an object (e.g., a pedestrian, a bicycle, or a vehicle) on or around a road at an intersection or the like, a driver of the traveling vehicle performs an operation to decelerate the vehicle while maintaining a predetermined clearance or interval (lateral distance) between the traveling vehicle and the object in a lateral direction orthogonal to a traveling direction of the vehicle. Specifically, in order to avoid a danger arising from a situation where a pedestrian walks across the traveling road, or a bicycle or a second vehicle suddenly starts moving toward the traveling road, the relative speed of the traveling vehicle with respect to such an object is reduced to a smaller value as the clearance is smaller.

As above, a driver drives a vehicle to avoid dangers while taking into account a relationship between a distance (including a distance in a lateral (width) direction of a road (lateral distance) and a distance in a longitudinal direction of the load (longitudinal distance)) between an object and the vehicle, and a relative speed between the object and the vehicle.

Therefore, in this embodiment, as depicted in FIG. 2, the vehicle control system of the vehicle 1 is configured to set, with respect to an object (e.g., the vehicle 51) detectable from the vehicle 1, a two-dimensional distribution (speed distribution area 40) defining an allowable upper limit value of a relative speed of the vehicle 1 with respect to the object in the traveling direction, around the object (over a lateral spatial region, a rearward spatial region, and a forward spatial region with respect to the object). In the speed distribution area 40, the allowable upper limit value $V_{lim}$ of the relative speed is set at each point around the object. During operation of the driving assistance system, the relative speed of the vehicle 1 with respect to the object is limited by the allowable upper limit values $V_{lim}$ in the speed distribution area 40.

As can be seen from FIG. 2, the speed distribution area 40 is set such that the allowable upper limit value of the relative speed becomes smaller as the lateral distance and/or the longitudinal distance from the object become smaller (the vehicle 1 comes closer to the object). In FIG. 2, for the sake of facilitating understanding, a plurality of constant relative speed lines are drawn by connecting points each having the same allowable upper limit value. The constant allowable upper limit values $V_{lim}$ represented as the relative speed lines a, b, c, d are, respectively, 0 km/h, 20 km/h, 40 km/h, and 60 km/h.

It should be noted that the speed distribution area 40 may not necessarily be set fully around the object, but may be set on at least one side of the lateral direction in a spatial region where the vehicle 1 exists (in FIG. 2, the right spatial region with respect to the vehicle 51 in FIG. 2). In FIG. 2, the speed distribution area 40 is also set in a region on which the vehicle 1 will not travel (outside the traveling road 2). Alternatively, the speed distribution region 40 may be set only on the traveling road 2. Further, in FIG. 2, the allowable upper limit value in the speed distribution area 40 is set up to 60 km/h. Alternatively, the allowable upper limit value in the speed distribution area 40 may be set up to a higher relative speed.

As depicted in FIG. 3, when the vehicle 1 travels at a certain absolute speed, the allowable upper limit value $V_{lim}$ which is set in the lateral direction with respect to the object is 0 (zero) km/h under a condition that the clearance X is equal to or less than $D_0$ (safe distance), and is quadratically increased under a condition that the clearance X is equal to or greater than $D_0$ ($V_{lim}=k\,(X-D_0)^2$, where $X \geq D_0$). That is, in order to ensure safety, the relative speed of the vehicle 1 is set to zero under the condition that the clearance X is equal to or less than $D_0$. On the other hand, under the condition that the clearance X is equal to or greater than $D_0$, the vehicle 1 is allowed to pass by the object at a higher relative speed, as the clearance becomes larger.

In the example depicted in FIG. 3, the allowable upper limit value in the lateral direction with respect to the object is defined as $V_{lim}=f(X)=k\,(X-D_0)^2$. In this formula, k denotes a gain factor related to a rate of change of $V_{lim}$ with respect to X, and is set depending on types of the object, or the like. $D_0$ is also set depending on types of the object, or the like.

In this embodiment, $V_{lim}$ is defined as including the safe distance and to be a quadratic function of X. Alternatively, $V_{lim}$ may be defined without including the safety distance and by another function (e.g., a linear function). Further, although the allowable upper limit value $V_{lim}$ has been described with reference to FIG. 3 and with regard to the lateral direction with respect to the object, it may be set in all radial directions including the longitudinal direction with respect to the object, in the same manner as described above. In this case, the factor k and the safety distance $D_0$ may be set according to the direction from the object.

In the state depicted in FIG. 2, the vehicle 1 can travel, for example, along a course R1 which is a direct (straight-ahead) course and a course R2 which is an indirect (detour) course. In this embodiment, these courses are calculated depending on the situation.

The direct course R1 is set to cut across the constant relative speed lines d, c, c, d of the speed distribution area 40 in this order. Thus, when the vehicle 1 travels on the course R1, the allowable upper limit value $V_{lim}$ gradually lowers and then gradually rises again. Thus, in one example, the vehicle 1 which is currently traveling at 60 km/h can be controlled such that the vehicle speed thereof is lowered to 40 km/h or less before reaching just beside the vehicle 51, and then increased after passing by the vehicle 51. In this embodiment, the speed calculation section 13 of the ECU 10 is configured to calculate a current vehicle speed of the vehicle 1, and the avoidance control execution section 15 is configured to control the vehicle speed such that it becomes equal to a value according to an amount of depression of an accelerator pedal as long as it falls within an upper limit defined by the allowable upper limit value on the course R1.

The indirect course R2 means a course passing outside the constant relative speed line d in the speed distribution area 40. Thus, the vehicle 1 is allowed to travel at a relative speed of 60 km/h or more. Therefore, in one example, the vehicle 1 which is currently traveling at 60 km/h can be controlled to pass by the vehicle 51 without lowering the vehicle speed. In this embodiment, the speed calculation section 13 of the ECU 10 is configured to calculate the current vehicle speed of the vehicle 1, and the avoidance control execution section 15 is configured to control the vehicle speed of the vehicle 1 such that it becomes equal to a value according to the amount of depression of the accelerator pedal as long as it falls within an upper limit defined by the allowable upper limit value on the course R2. In addition, the avoidance control execution section 15 executes control of the steering direction of the vehicle 1 so that the vehicle 1 travels on the course R2.

Figure 4:
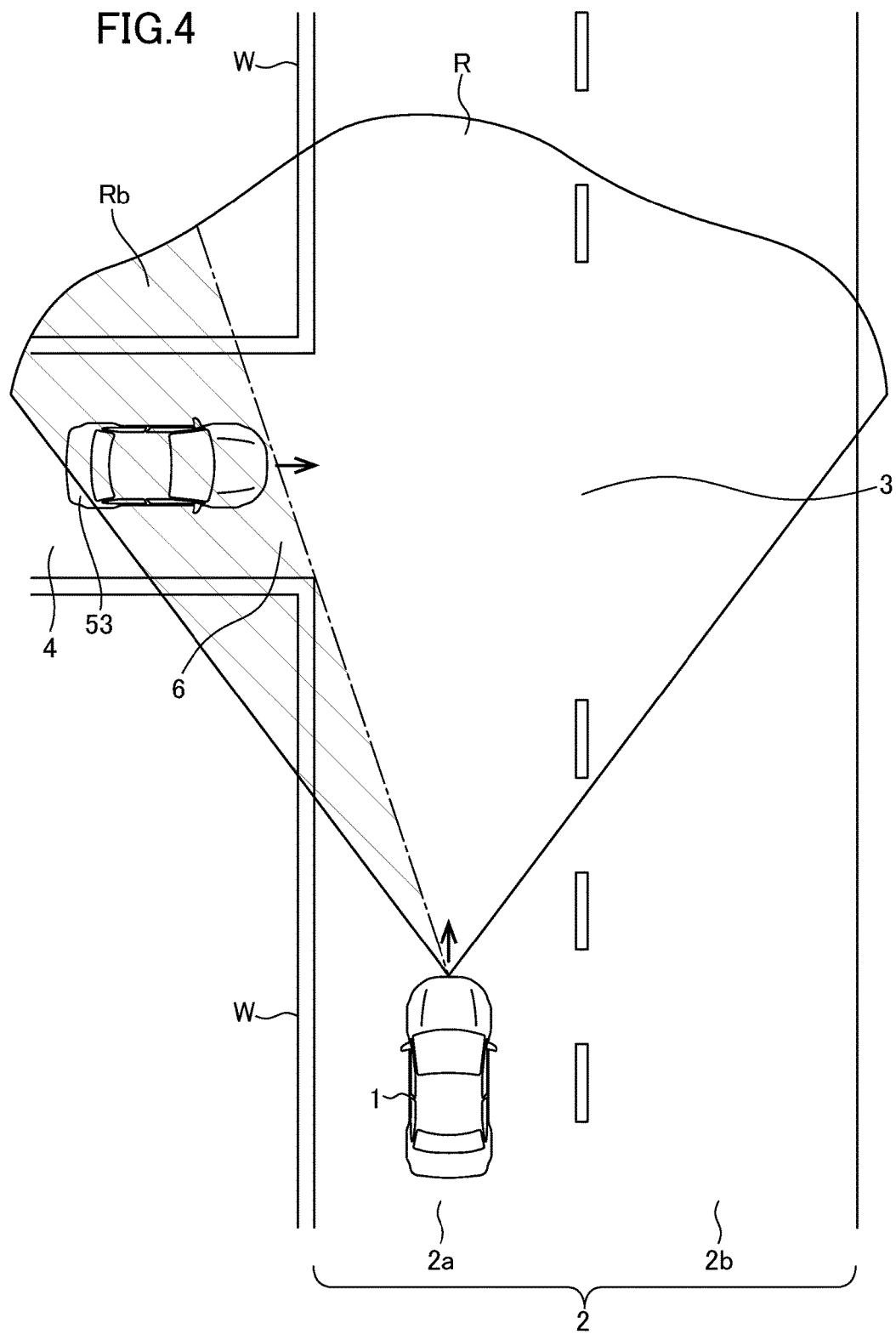
FIG. 4 is an explanatory diagram depicting a state in which a vehicle is approaching a T-shaped intersection.
Figure 5:
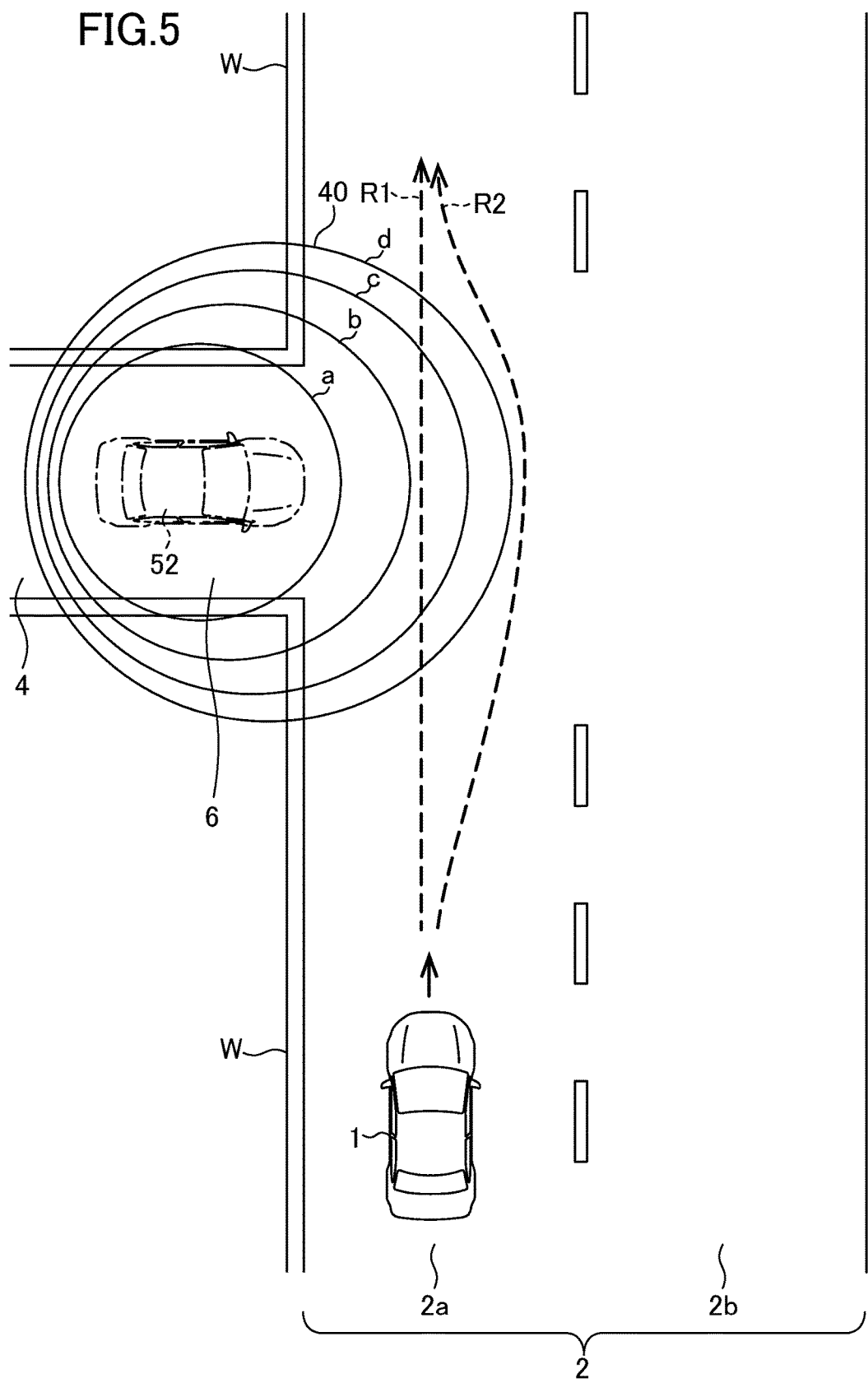
FIG. 5 is an explanatory diagram of a speed distribution area which is set with respect to a virtual object, in this embodiment.
Figure 6:
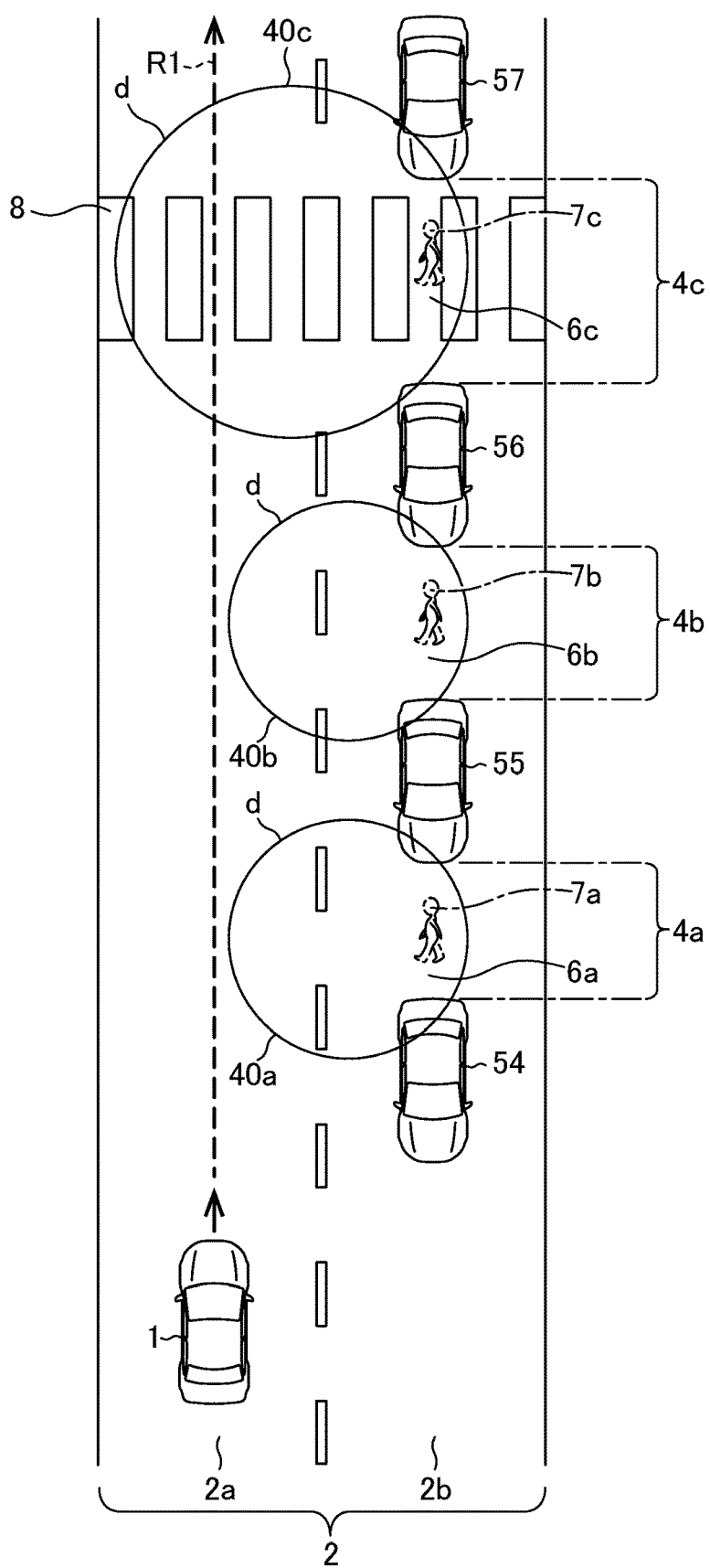
FIG. 6 is an explanatory diagram of another speed distribution area which is set with respect to a virtual object, in this embodiment.

Next, with reference to FIGS. 4 to 6, the driving assistance control in this embodiment will be described. FIG. 4 is an explanatory diagram depicting a state in which a vehicle is approaching a T-shaped intersection, and FIGS. 5 and 6 are explanatory diagrams of a speed distribution area which is set with respect to a virtual object.

FIG. 4 depicts a state in which the vehicle 1 is traveling in a lane 2a of the traveling road 2 having two lanes. At the T-shaped intersection 3 located forward of the vehicle 1, the side road 4, i.e., a connection path, is connected to the traveling road 2. A plurality of sidewalls W are provided on a left side of the traveling road 2 and on both sides of the side road 4.

In the vehicle 1, images in an imaging range R are taken by the vehicle-mounted camera 21, and, based on the resulting image data, the presence or absence of and a type (pedestrian, bicycle, vehicle or the like) of an object is detected and identified. When an object is detected, the speed distribution area 40 is set with respect to the detected object.

However, in the imaging range R, a hatched region Rb hidden behind the side wall W becomes a blind area from the vehicle 1. A second vehicle 53 being traveling in a connection region 6 between the side road 4 and the traveling road 2 or being temporality stopping at the connection region 6 is included in this blind area. Thus, the vehicle 1 cannot detect the vehicle 53 being temporality stopping, as an object. As a result, the speed distribution area 40 is not set with respect to the vehicle 53 which is present in the blind area and has not been detected as an object. As used herein, the term "connection region between the connection path and the traveling road" means a vicinity of an end of the connection path on the side of the traveling road. For example, it may be a range from the end of the connection path toward a side away from the traveling road by a given distance (e.g., 3 to 10 m), and may include a part of the traveling road.

Generally, when passing through an intersection having such a blind area, a driver of a vehicle passes through the intersection while lowering the vehicle speed and confirming safety based on the driver's normal attentiveness so as to cope with the situation where an object (a second vehicle, a pedestrian, a bicycle or the like) enters from such a side road into the traveling road. However, when the driver's attentiveness lowers, there is a possibility that the driver fails to sufficiently lower the vehicle speed at the intersection, leading to a situation where the vehicle passes by the object on the side road at a high passing speed.

Therefore, in this embodiment, as depicted in FIG. 5, when a connection path is detected from image data, map information or the like and even when no object is detect based on the image data although an object possibly exists in the blind area, on an assumption that a virtual object 52 exist in the blind area, a speed distribution area 40 is set with respect to the virtual object 52. The virtual object 52 may be assumed to be located at any position in the connection region 6 between the lane 2a and the side road 4 (e.g., in a central region of the side road 4 at a merging point with the lane 2a). In this embodiment, the virtual object 52 at the intersection may be, for example, a second vehicle.

In the example depicted in FIG. 5, the blind area is formed by the side wall W. Alternatively, the blind area may be formed by a parked vehicle, a public construction, a row of trees or the like.

In the vehicle 1, a course thereof is calculated by taking into account the speed distribution area 40 set with respect to the virtual object 52. In this embodiment, the presence of an oncoming vehicle in an opposite lane 2b may be also taken into account in the calculation of the course. When an oncoming vehicle in the opposite lane 2b is determined, based on image data taken by the vehicle-mounted camera 21 and measurement data obtained by the millimeter-wave radar 22, to exist at a position forward of the vehicle 1 within a given inter-vehicle distance, the direct course R1 is calculated. On the other hand, when it is determined that there is no oncoming vehicle within the given inter-vehicle distance, the indirect course R2 for taking a detour without entering the opposite lane while suppressing a decrease in vehicle speed is calculated. Then, in the vehicle 1, control of the vehicle speed and/or steering is executed according to the calculated course.

FIG. 6 depicts a state in which while the vehicle 1 is traveling in the lane 2a, and a plurality of vehicles 54 to 57 are stopped in the opposite lane 2b due to a traffic jam or the like. In this state, there is a possibility that a pedestrian, a bicycle or the like enters the lane 2a from between two of the vehicles. Thus, in this embodiment, when two vehicles successively located with a given distance or less therebetween are detected from image data taken by the vehicle-mounted camera 21, a space between the two vehicles is detected as a virtual connection path. Then, even when no object is detected between the two vehicles (i.e., on a virtual connection path) from the image data, a virtual object is assumed to exist in the virtual connection path, and, based on this assumption, a speed distribution area is set with respect to the virtual object.

In FIG. 6, a space between a second vehicle 54 and a third vehicle 55 is detected as a virtual connection path 4a, and a virtual object 7a (e.g., a pedestrian) is assumed to exist in a connection region 6a from the connection path 4a to the traveling lane 2a. Then, based on this assumption, a speed distribution area 40a is set. Similarly, virtual connection paths 4b and 4c are detected, respectively, between the third vehicle 55 and a fourth vehicle 56 and between the fourth vehicle 56 and a fifth vehicle 57, and virtual objects 7b, 7c are assumed to exist, respectively, in connection regions 6b, 6c. Then, based on this assumption, speed distribution areas 40b, 40c are set. In this embodiment, the virtual object between the two vehicles may be detected as a pedestrian. In FIG. 6, only a constant relative speed line d is depicted in each of the speed distribution areas.

Further, when a pedestrian crossing 8 extending across the traveling road 2 is detected based on the image data, and the virtual connection path 4c is detected at a position on or adjacent to the pedestrian crossing 8, the speed distribution area 40c is set with respect to the virtual object 7c, in a pattern different from that of the speed distribution areas 40a, 40b depicted in FIG. 6. That is, in this case, the speed distribution area 40c is set such that, as compared to the speed distribution areas 40a and 40b, the allowable upper limit value thereof becomes lower at the same spaced-apart distance from the virtual object. Therefore, in one example, the range of the constant relative speed line d of the speed distribution area 40c is wider than that of the constant relative speed line d of the speed distribution areas 40a, 40b. This is because the virtual connection path 4c is set on the pedestrian crossing 8, and thus a pedestrian or a bicycle is more likely to enter the lane 2a through the connection path 4c than through the other connection paths 4a, 4b.

In the above example, the virtual connection path is assumed to be defined between two vehicles. Alternatively, a space between two structural objects (e.g., vehicles, constructions, or trees) disposed on a side of the traveling road 2 may be assumed as the virtual connection path.

In the example depicted in FIG. 6, a course of the vehicle 1 is calculated while taking into account the speed distribution areas 40a, 40b, 40c set with respect to the virtual objects 7a, 7b, 7c, as with the example depicted in FIG. 5. In FIG. 6, there are oncoming vehicles in the opposite lane 2a, so that the direct course R1 is calculated. Then, vehicle speed control for the vehicle 1 is executed according to the calculated course.

Figure 7:
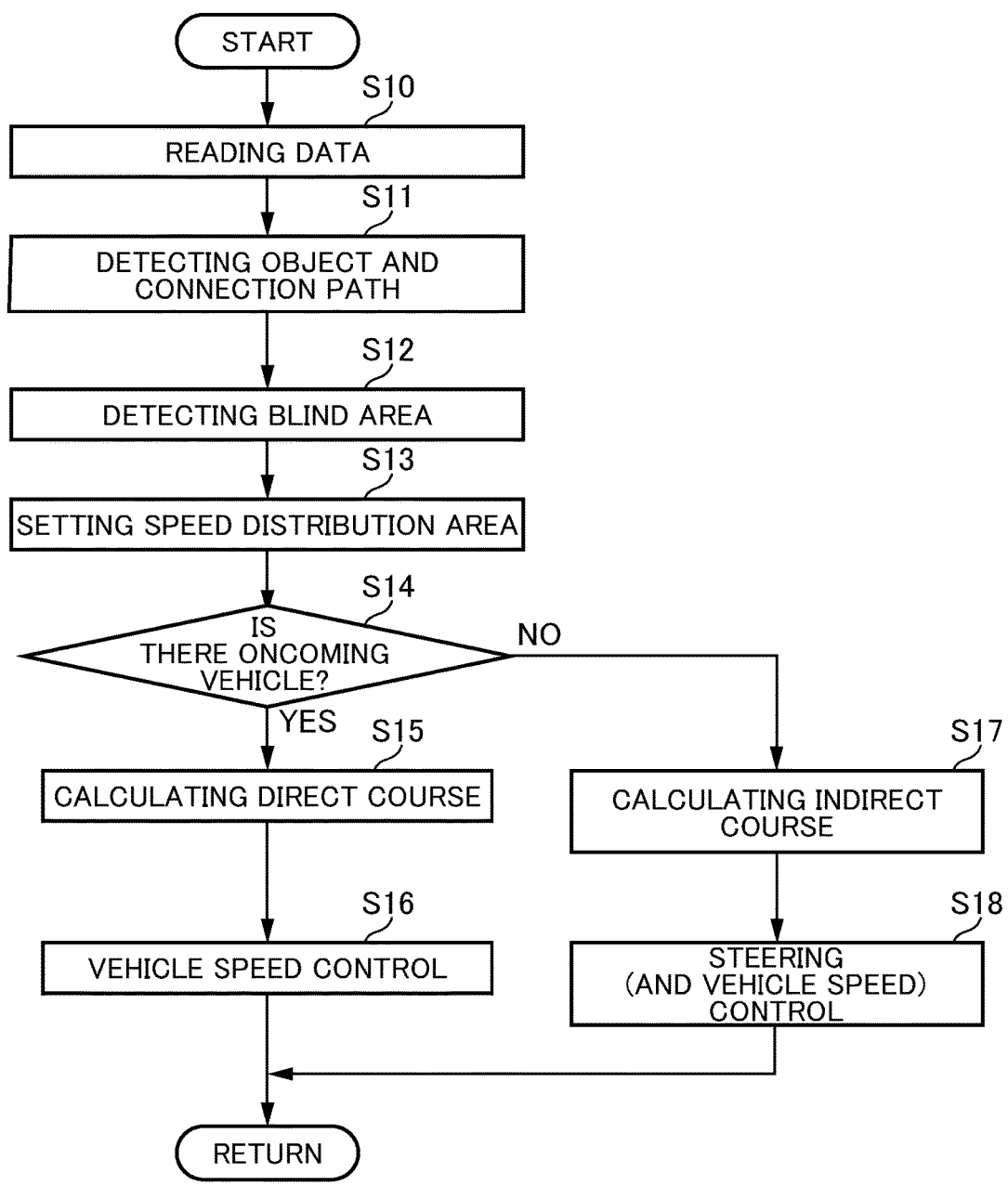
FIG. 7 is a processing flow of a driving assistance control in this embodiment.

Next, with reference to FIG. 7, a processing flow of a driving assistance control according to this embodiment will be described. FIG. 7 is a processing flow of a driving assistance control.

As depicted in FIGS. 2, 5, and 6, when the vehicle 1 is traveling on the traveling road 2, the ECU 10 of the vehicle 1 operates to acquire various data from the plurality of sensors (S10). Specifically, the ECU 10 operates to receive: image data from the vehicle-mounted camera 21 taking images of a forward side of the vehicle 1; measurement data from the millimeter-wave radar 22; and vehicle speed data from the vehicle speed sensor 23.

Then, the ECU 10 (object detection section 11) operates to execute processing of detecting an object and a connection path (S11). In this object and connection path detection processing, the ECU 10 operates to perform image processing of the image data to (in the example depicted in FIG. 2) detect the vehicle 51 as an object, or to (in the examples depicted in FIGS. 5 and 6) detect the side road 4 and/or the space (connection paths 4a, 4b or 4c) between two vehicles, as connection paths. In this process, a type of the object (in the example depicted in FIG. 2, a vehicle) is identified. In the case where an object and a connection path are detected in the same region, the object is prioritized. Thus, in the example depicted in FIG. 2, the vehicle 51 is detected in the connection region between the side road 4 and the traveling road 2, so that the vehicle 51 is detected as an object without detecting the side road 4 as a connection path. Further, the ECU 10 can operate to detect the presence of the connection path from the map information.

Subsequently, when a connection path is detected, the ECU 10 (object detection section 11) operates to execute a blind area detection processing of determining whether or not there is a blind area in which an object is hidden in the detected connection path (S12). In this blind area detection processing, based on the image data, the ECU 10 operates to determine that there is a blind area, when at least a part of the connection region is hidden by a construction or the like located on the side of the vehicle 1, in a range from a road surface to a given height position (e.g., in the range of 0 m to 3 m) and by at least a given breadth (e.g., by an area occupied by a child).

Then, when it is determined that there is a blind area, the ECU 10 operates to assume that a specific type of virtual object exists in the connection region having the blind area. In the example depicted in FIG. 5, it is assumed that the virtual object 52 (vehicle) exists in the connection region 6. On the other hand, in the example depicted in FIG. 6, it is assumed that the virtual objects 7a, 7b, 7c (pedestrians) exist, respectively, in the connection regions 6a, 6b, 6c. The type of the virtual object to be identified can be set according to a location of the detected connection path. For example, a virtual object detected at an intersection is a vehicle, and a virtual object detected at a connection path defined between constructions is a pedestrian.

Subsequently, the ECU 10 (speed distribution area setting section 12) operates to set a speed distribution area with respect to the object and/or the virtual object (S13). In FIG. 2, the speed distribution area 40 is set with respect to the vehicle 51. In the example depicted in FIG. 5, the speed distribution area 40 is set with respect to the virtual object 52. In the example depicted in FIG. 6, the speed distribution areas 40a, 40b, 40c are set with respect to the virtual objects 7a, 7b, 7c. As described above, when the connection path is detected at a position on or adjacent to a pedestrian crossing, the speed distribution area is set such that, as compared to when the connection path is detected at a position which is not located on or adjacent to the pedestrian crossing, the allowable upper limit value thereof becomes lower at the same spaced-apart distance.

Subsequently, based on the set speed distribution area(s), the ECU 10 (the course calculating section 14) operates to calculate a travelable course of the vehicle 1 and a set vehicle speed or a target vehicle speed at each position on the course, according to the situation. The set vehicle speed is calculated such that, at each point on the course, a relative speed of the vehicle 1 with respect to the object and the virtual object becomes equal to or less than the allowable upper limit value $V_{lim}$ in the speed distribution area, and a change in the vehicle speed along the course becomes smooth.

Specifically, based on the image data from the vehicle-mounted camera 21 and the measurement data from the millimeter-wave radar 22, the ECU 10 operates to determine whether or not there is an oncoming vehicle or the like in the opposite lane, in a given distance range forward of the vehicle 1 (S14). When it is determined that there is an oncoming vehicle (S14: Yes), the ECU 10 operates to calculate a direct course (S15). On the other hand, when it is determined that there is no oncoming vehicle (S14; No), the ECU 10 operates to calculate an indirect course (S17). The indirect course is calculated so as to prevent the vehicle 1 from deviating from the traveling lane 2a, while maintaining the current vehicle speed. The processing flow depicted in FIG. 7 is repeatedly executed at intervals of a given cycle time (e.g., 0.1 second). Thus, a course to be calculated and a set vehicle speed on the calculated course vary with time.

For example, in the examples depicted in FIGS. 2 and 5, when there is an oncoming vehicle in the opposite lane, the course R1 is calculated, whereas, when there is no oncoming vehicle, the course R2 is calculated. In the example depicted in FIG. 6, there are oncoming vehicles in the opposite lane, and thus the course R1 is calculated.

When the direct course is calculated, the ECU 10 (avoidance control execution section 15) operates to control the vehicle speed to enable the vehicle 1 to travel on the calculated course (S16). For example, in the example depicted in FIG. 5, the course R1 is set to cut across the constant relative speed lines d, c, c, d of the speed distribution area 40 in this order. Therefore, when the vehicle 1 travels on the course R1, the allowable upper limit value of the relative speed in the traveling direction changes on the course R1. Specifically, the allowable upper limit value decreases once, and then increases. The vehicle speed of the vehicle 1 is calculated by the speed calculation section 13, based on the vehicle speed data received from the vehicle speed sensor 23.

In an avoidance control in this embodiment, when the vehicle 1 enters the course R1 and even when a driver maintains the amount of depression of the accelerator pedal constant, the relative speed of the vehicle 1 is maintained at an allowable upper limit value at each point in the speed distribution area 40, within the vehicle speed (as an upper limit) according to the amount of depression of the accelerator pedal. Thus, for example, when the vehicle 1 enters the course R1 (FIG. 5) at a relative speed of 60 km/h, the vehicle 1 is automatically decelerated as it approaches the virtual object 52, and, after passing by the virtual object 52, accelerated to a vehicle speed according to the amount of depression of the accelerator pedal.

In order to execute this avoidance control, the ECU 10 operates to output an engine output change request signal and a brake request signal, respectively, to the engine control system 31 and the brake control system 32 so as to follow the allowable upper limit value on the course R1 within the vehicle speed (as an upper limit) according to the amount of depression of the accelerator pedal, and prevent the vehicle speed from exceeding the allowable upper limit value.

When the indirect course is calculated, the ECU 10 (avoidance control execution section 15) operates to control the steering direction (and optionally the vehicle speed, as needed basis), so as to enable the vehicle 1 to travel on the calculated course (S18). For example, in the example depicted in FIG. 5, the course R2 is set to pass outside the constant relative speed line d in the speed distribution area 40. Therefore, when the vehicle 1 travels on the course R2, the vehicle 1 can maintain a vehicle speed of at least 60 km/h.

Thus, for example, when the vehicle 1 enters the course R2 at 60 km/h, it can travel on the course R2 by automatic steering, while maintaining the same vehicle speed. In order to execute this avoidance control, the ECU 10 operates to output a steering direction change request signal to the steering control system 33 so as to enable the vehicle 1 to travel on the course R2. In this process, the vehicle speed according to the amount of depression of the accelerator pedal is maintained, so that the engine output change request signal and the brake request signal are not outputted.

In the meantime, for example, when the vehicle speed on the course R2 is set to become lower than the current vehicle speed in the speed distribution area so as to prevent the vehicle 1 from deviating from the traveling lane, the ECU 10 operates to output the engine output change request signal and the brake request signal so as to prevent the vehicle speed of the vehicle 1 from exceeding a predetermined value (i.e., the allowable upper limit value), i.e., enable the vehicle speed to fall within the vehicle speed (as an upper limit) according to the amount of depression of the accelerator pedal.

In the above embodiment, when a blind area is detected in a connection path, the speed distribution area is set on the assumption that a virtual object exists in the blind area. Alternatively, at a time when a connection path is detected, the presence of a virtual object may be assumed, irrespective of the presence or absence of a blind area, and, based on this assumption, the speed distribution area may be set.

In this modified embodiment, when a connection path (4; 4a to 4c) connected to the traveling road 2 is detected at a position forward of the vehicle 1 being traveling, a virtual object (52; 7a to 7c) is assumed to exist in a connection region (6; 6a to 6c) between the connection path and the traveling road, and, based on this assumption, the speed distribution area (40; 40a to 40c) is set with respect to the virtual object. Thus, in the modified embodiment, in an area to which the connection path is connected, the vehicle speed of the vehicle 1 is limited by the allowable upper limit value $V_{lim}$ in the set speed distribution area, and/or the steering direction is controlled to prevent the vehicle speed from exceeding the allowable upper limit value $V_{lim}$. Therefore, in the modified embodiment, even when a second vehicle, a pedestrian or the like unexpectedly enters an area where the connection path is connected to the traveling road, it becomes possible to reliably avoid a minor collision with the entered object.

In the above embodiment, the speed distribution area setting section 12 is configured to set the speed distribution area when at least a part of the connection region between the detected connection path and the traveling road is determined to be a blind area of the vehicle 1, so that, even when the object detection section 11 fails to detect an object such as a second vehicle, a pedestrian or a bicycle which exists in the blind area in the connection region between the detected connection path and the traveling road, the speed distribution area is set on the assumption that the object exists in the blind area. Thus, even when a potential object failing to be detected enters the traveling road, it becomes possible to avoid a minor collision with the entered object.

In the above embodiment, the connection path is a side road 4 connected to the traveling road 2 or a space between two structural objects (e.g., adjacent two of the vehicle 54 to 57) arranged along the traveling road 2, so that the connection path includes not only the side road 4 connected to the traveling road 2, but also the space between the two movable or immovable structural objects. That is, the connection path additionally includes a space which is not generally recognized as a road. This makes it possible to execute the avoidance control so as to cope with the situation where a pedestrian or the like enters from such a connection path into the traveling road.

Further, in the connection path 4c located around the pedestrian crossing 8, a possibility that a pedestrian enters the traveling road 2 is higher, as compared to the connection path 4a or 4b which is not located around the pedestrian crossing 8. Thus, in the above embodiment, when a connection path 4c is detected at a position on or adjacent to the pedestrian crossing 8 extending across the traveling road 2, the speed distribution area 40c is set such that, as compared to when the connection path 4a or 4b detected at a position which is not on or adjacent to the pedestrian crossing 8, the allowable upper limit value $V_{lim}$ thereof becomes lower at the same lateral distance. This makes it possible to set the speed distribution area 40c such that the vehicle speed of the vehicle 1 is limited to a lower value in the connection path 4c around the pedestrian crossing 8, thereby providing improved safety.

LIST OF REFERENCE SIGNS

1: vehicle
2: traveling road
2a: traveling lane
2b: opposite lane
3: T-shaped intersection
4: side road
4a, 4b, 4c: connection path
6, 6a, 6b, 6c: connection region
7a, 7b, 7c: virtual object
8: pedestrian crossing
11: object detection section
12: speed distribution area setting section
13: speed calculation section 14: course calculation section
15: avoidance control execution section
21: vehicle-mounted camera
22: millimeter-wave radar
23: vehicle speed sensor
24: positioning system
25: navigation system
31: engine control system
32: brake control system
33: steering control system
40, 40a, 40b, 40c: speed distribution area
51: vehicle
52: virtual object
53 to 57: vehicle
100: vehicle control system

The invention claimed is:

1. A vehicle control device mounted in a vehicle, comprising:
an object detection section for detecting a connection path which is connected, at a position forward of the vehicle, to a traveling road on which the vehicle is traveling;
a speed distribution area setting section for setting a speed distribution area extending at least in a lateral spatial region with respect to an object located forward of the vehicle and defining a distribution of an allowable upper limit value of a vehicle speed of the vehicle, wherein the speed distribution area is set such that the allowable upper limit value becomes lower as a distance from the object becomes smaller; and
an avoidance control execution section for executing avoidance control of changing the vehicle speed and/or a steering direction of the vehicle to prevent the vehicle speed of the vehicle from exceeding the allowable upper limit value in the speed distribution area;
wherein the speed distribution area setting section is configured, upon detection of the connection path by the object detection section, to set the speed distribution area on an assumption that an object exists in a connection region between the detected connection path and the traveling road.

2. The vehicle control device as recited in claim 1, wherein the speed distribution area setting section is configured, when it determines that at least a part of the connection region between the detected connection path and the traveling road is a blind area of the vehicle, to set the speed distribution area.

3. The vehicle control device as recited in claim 1, wherein the blind area is formed by a sidewall delimiting the traveling road or the connection path.

4. The vehicle control device as recited in claim 1, wherein the object detection section is configured to detect the connection path, based on map information and current vehicle position information, or based on image data taken by a vehicle-mounted camera.

5. The vehicle control device as recited in claim 1, wherein the connection path is a side road connected to the traveling road, or a space defined between two structural objects arranged along the traveling road.

6. The vehicle control device as recited in claim 5, wherein the two structural objects include two vehicles.

7. The vehicle control device as recited in claim 1, wherein when the connection path is detected at a position on or adjacent to a pedestrian crossing extending across the traveling road, the speed distribution area is set such that, as compared to when the connection path is detected at a position which is not located on or adjacent to the pedestrian crossing, the allowable upper limit value of the speed distribution area becomes lower at a same lateral distance.

* * * * *